United States Patent
Carbone

(10) Patent No.: US 9,102,418 B2
(45) Date of Patent: Aug. 11, 2015

(54) CANTILEVERED DIFFERENTIAL MOTION SENSOR AND ASSOCIATED FRAME

(75) Inventor: Michael Carbone, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 889 days.

(21) Appl. No.: 12/977,114

(22) Filed: Dec. 23, 2010

(65) Prior Publication Data

US 2012/0104178 A1  May 3, 2012

Related U.S. Application Data

(60) Provisional application No. 61/407,627, filed on Oct. 28, 2010.

(51) Int. Cl.
*G01B 21/00* (2006.01)
*B64D 45/00* (2006.01)

(52) U.S. Cl.
CPC ...... *B64D 45/0005* (2013.01); *B64D 2045/001* (2013.01); *Y10T 29/49826* (2015.01)

(58) Field of Classification Search
USPC ......... 73/802, 860, 783, 855, 152.02, 170.02, 73/866.5; 324/528; 200/61.62
See application file for complete search history.

(56) References Cited

U.S. PATENT DOCUMENTS

| | | | |
|---|---|---|---|
| 2,595,683 A * | 5/1952 | Lo Monte | 294/99.2 |
| 3,265,068 A * | 8/1966 | Holohan | 606/210 |
| 3,392,727 A * | 7/1968 | Hanlon | 606/210 |
| 3,675,282 A | 7/1972 | Summers et al. | 24/602 |
| 4,494,716 A | 1/1985 | Breedveld et al. | 244/213 |
| 4,639,593 A | 1/1987 | Stetson et al. | 250/227.21 |
| 4,715,567 A | 12/1987 | Poccard | 244/213 |
| 5,254,131 A * | 10/1993 | Razi | 606/208 |
| 5,280,262 A | 1/1994 | Fischer | 337/405 |
| 5,600,295 A | 2/1997 | Kaufmann | 337/405 |
| 5,896,080 A | 4/1999 | Chen | 337/407 |
| 7,623,974 B2 | 11/2009 | Cipra | 702/41 |
| 7,650,804 B2 | 1/2010 | Yamagata et al. | 73/862.63 |
| 7,921,729 B2 | 4/2011 | Conner et al. | |
| 2002/0171556 A1* | 11/2002 | Emaci et al. | 340/686.2 |
| 2005/0125013 A1* | 6/2005 | Kessler | 606/148 |
| 2007/0283759 A1 | 12/2007 | Schnetker et al. | 73/577 |
| 2008/0183403 A1 | 7/2008 | Cipra | 702/34 |
| 2010/0055929 A1 | 3/2010 | Cain | |

OTHER PUBLICATIONS

European Search Report for Application No. 11181885.2, mailed Oct. 31, 2014.

* cited by examiner

*Primary Examiner* — Robert R Raevis
(74) *Attorney, Agent, or Firm* — Carlson, Gaskey & Olds P.C.

(57) ABSTRACT

The disclosed sensor includes a frame having a base and a plurality of arms integral with the base. The arms are biased to a relaxed position, which may be an extended position. A fuse is fastened between the arms to hold the arms in a non-relaxed position. When incorporated into an aircraft, for example, the disclosed sensor may be connected to a first panel, and a pin connected to a second panel may be positioned between the arms.

16 Claims, 5 Drawing Sheets

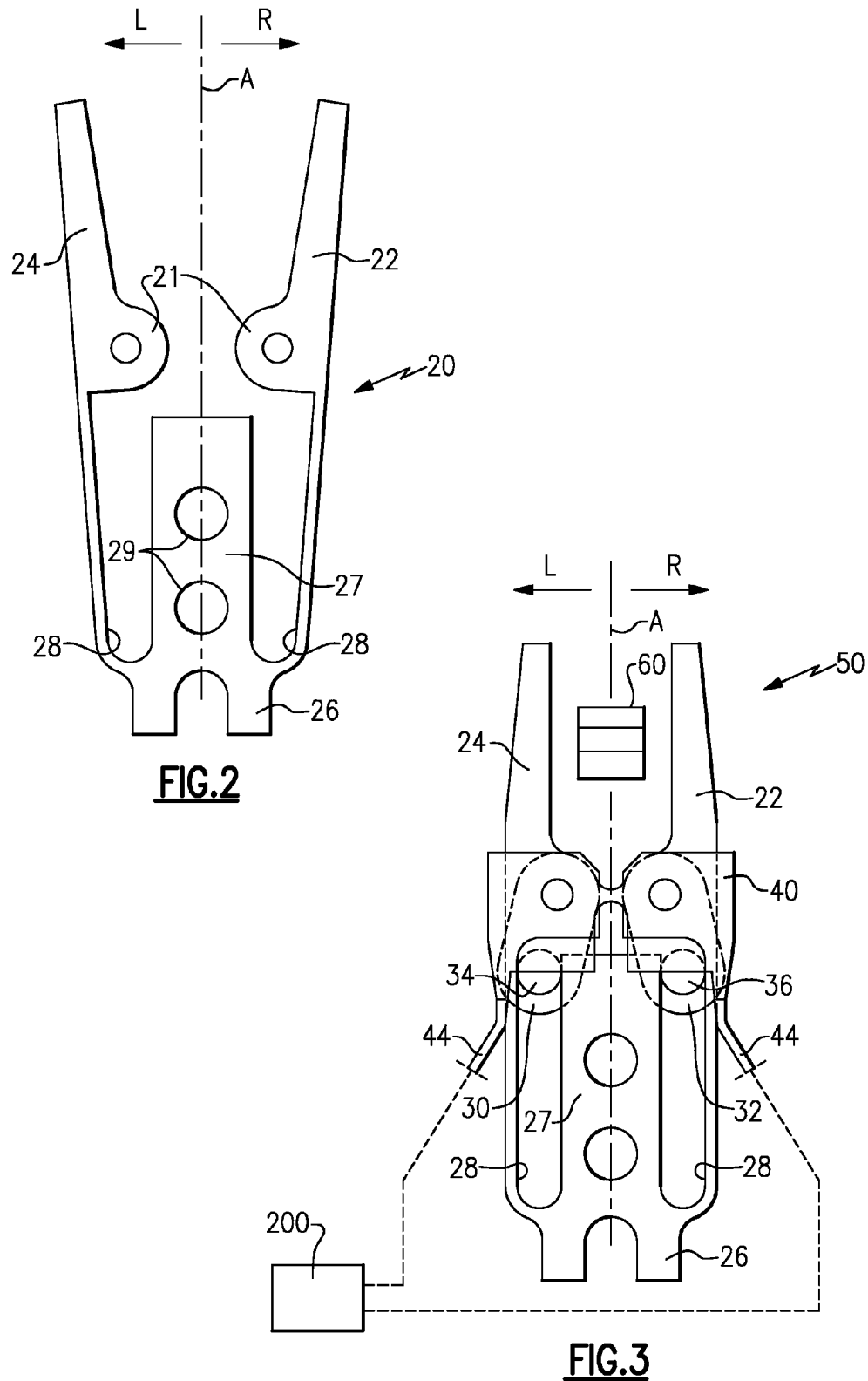

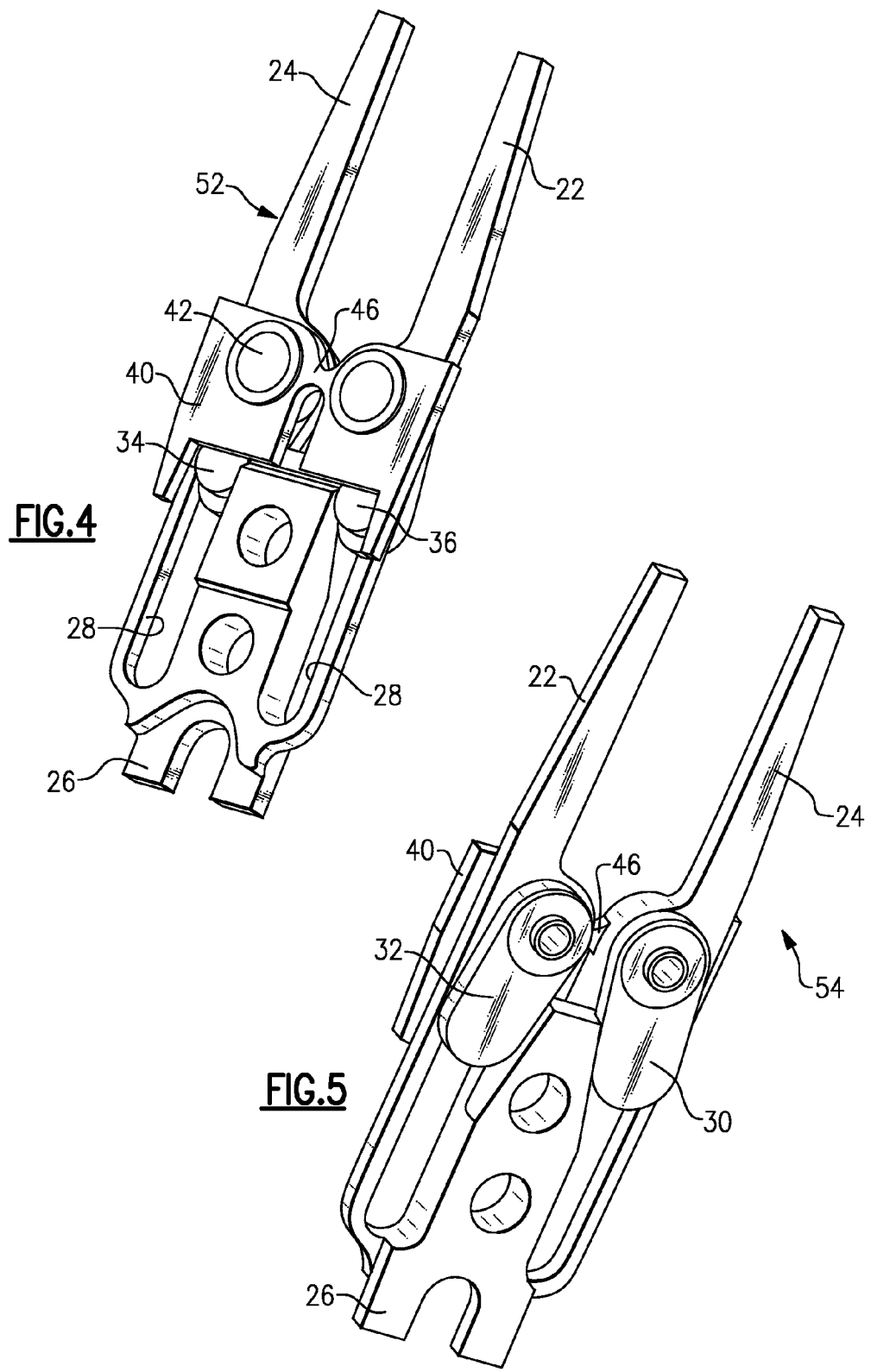

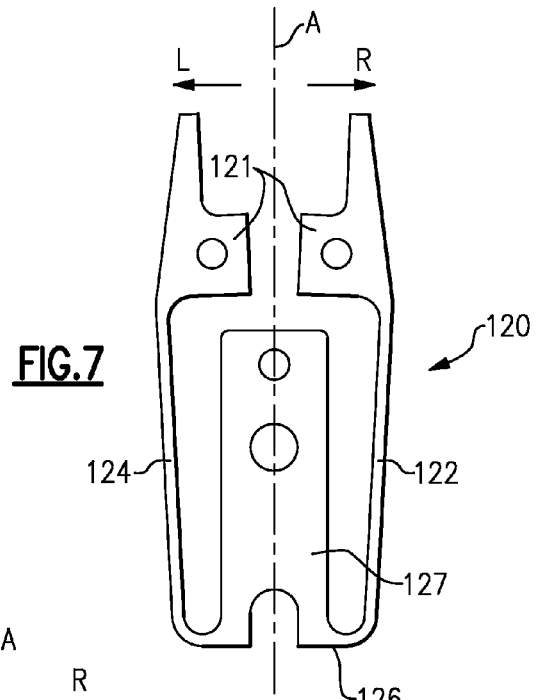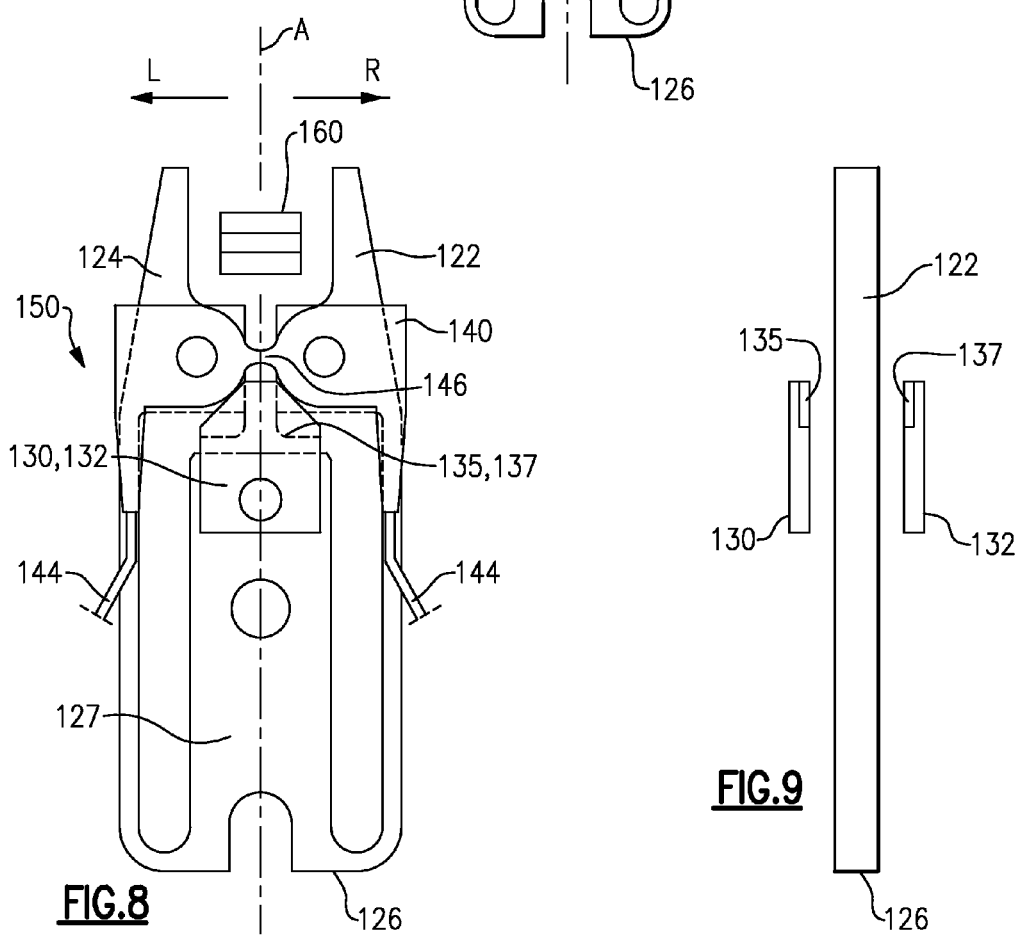

CANTILEVERED DIFFERENTIAL MOTION SENSOR AND ASSOCIATED FRAME

CROSS REFERENCE TO RELATED APPLICATIONS

This application claims priority to U.S. Provisional Application No. 61/407,627, which was filed Oct. 28, 2010.

BACKGROUND

This disclosure relates to a cantilevered differential motion sensor which may be used with an aircraft, for example.

Certain types of sensors include an electromechanical fuse between two arms. These sensors may be in communication with mechanical linkages (e.g., aircraft panels) designed to move together. Upon malfunction of one or more of these linkages, the fuse will fracture.

One known sensor includes two separate arms biased away from one another by a separation spring. The two arms are structurally different and require unique parts. Each arm is hingeably connected to a base by a hinge pin. The arms, the base, the spring and the hinge pins are each formed separately and then assembled together.

SUMMARY

The disclosed sensor includes a frame having a base and a plurality of arms. The arms are integral with the base and are biased to a relaxed position. A fuse is fastened between the arms to hold the arms in a non-relaxed position.

When incorporated into an aircraft, the disclosed sensor may be connected to a first panel, and a pin connected to a second panel may be positioned between the arms. Further disclosed is a method of assembling the sensor.

BRIEF DESCRIPTION OF DRAWINGS

The drawings can be briefly described as follows:

FIG. 2 is a top view of a first sensor frame showing arms in a relaxed position;

FIG. 3 is a top view of a first sensor including the sensor frame of FIG. 2, with the arms of the sensor frame in a non-relaxed position;

FIG. 4 is a perspective top-view of the sensor of FIG. 3, showing the sensor in an assembled state;

FIG. 5 is a perspective bottom-view of the sensor of FIG. 3, showing the sensor in an assembled state;

FIG. 7 is a view of another disclosed sensor frame, showing the sensor arms in a relaxed position;

FIG. 8 is a view of another disclosed sensor including the sensor frame of FIG. 8; and FIG. 9 is an exploded side view of the sensor of FIG. 9, showing the arrangement of the stabilization brackets.

DETAILED DESCRIPTION

Figure 1:
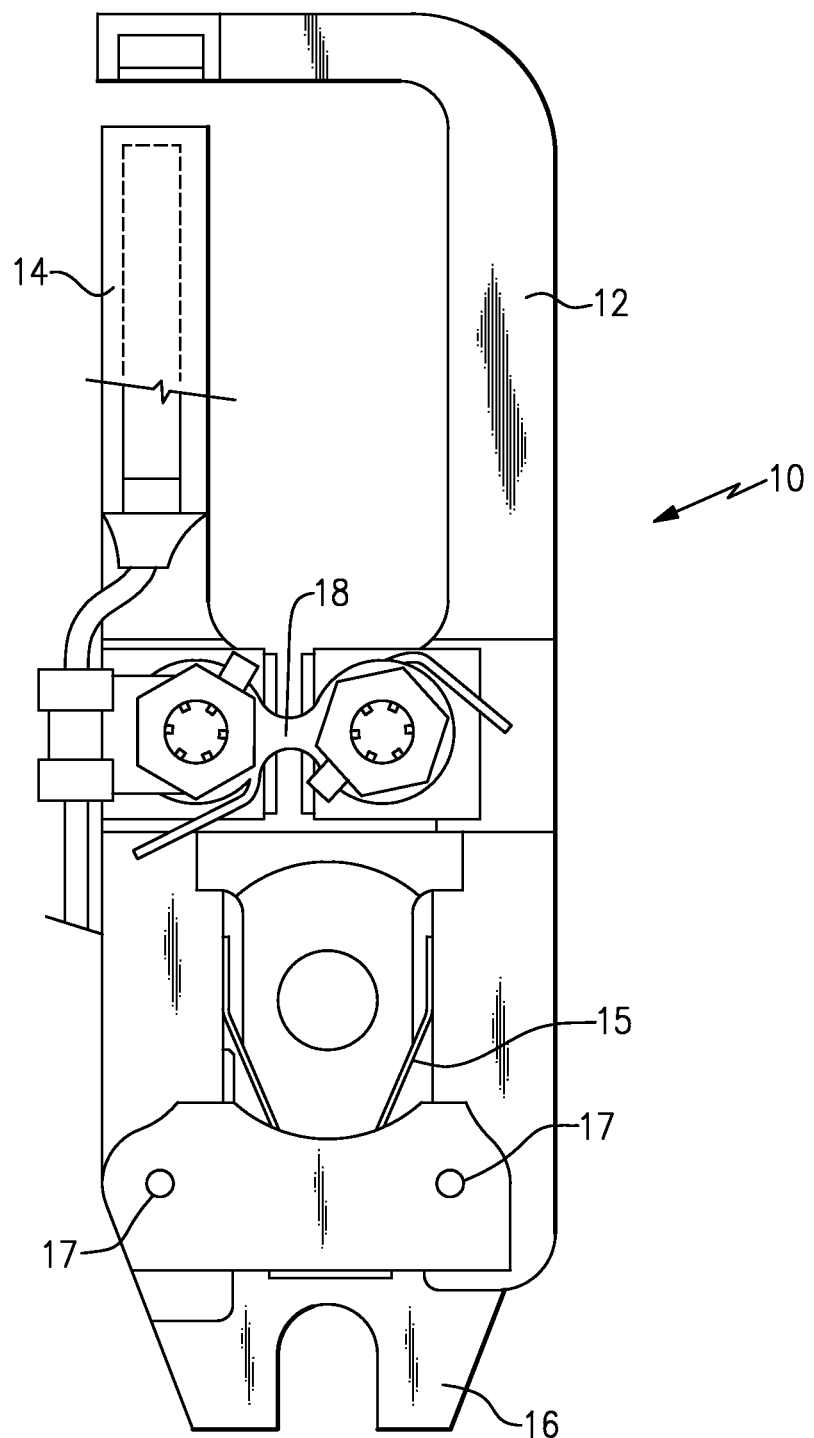
FIG. 1 is a view of a known sensor.

FIG. 1 shows a known motion sensor 10 including two separate arms 12, 14 biased away from one another by a separation spring 15. The arms 12, 14 are structurally different and require unique parts. Each arm 12, 14 is hingeably connected to a base 16 by a respective hinge pin 17. An electromechanical fuse 18 is provided between the arms 12, 14, and will fracture in certain conditions.

FIG. 2 shows a first disclosed cantilevered differential motion sensor frame 20 (or, frame 20) in a relaxed position, which is shown as being an extended position. The frame 20 includes a base 26 and a plurality of arms 22, 24 integrally formed with the base 26 and extending from opposite ends thereof. Notably, the shown arms 22, 24 are structurally identical and are mirrored about the central frame axis A of the frame 20. The arms 22, 24 need not be identical, however, and variations between the arms 22, 24 may be incorporated without dramatically impacting the functionality of the frame 20. A channel 28 is formed between the arms 22, 24, and a central portion 27 of the frame 20 projects from the base 26. The central portion 27 includes at least one hole 29 allowing attachment of the frame 20 to a panel (e.g., the panel 72 in FIG. 6A and described below) by way of a bolt, for example.

The frame 20 may be integrally formed by being machined or stamped from a single piece of material stock, which may be steel (say, passivated CRES, or corrosion-resistant steel) and may have a constant thickness, for example. The arms 22, 24 are formed at the relaxed position. In the shown relaxed position, which again is an extended position, the arms 22, 24 extend generally away from one another (and away from the central frame axis A) in directions R and L, respectively, and the arms 22, 24 are non-parallel to one another. Because the arms 22, 24 are formed in the relaxed position, and because of the properties of the material stock, the arms 22, 24 are resiliently biased to the relaxed position without the use of a separate spring (e.g., like the spring 15 shown in FIG. 1).

With reference to FIG. 3, the arms 22, 24 are pinched (or, urged) toward one another (and toward the central frame axis A) to facilitate sensor assembly. That is, arm 22 is moved in direction L against its bias toward direction R, and arm 24 is moved in direction R against its bias toward direction L. Of course, this "pinching" step requires force sufficient to overcome the bias of the arms 22, 24 toward the relaxed position.

A fuse 40 and two stabilization brackets 30, 32 are fastened to the frame 20 at lobe-shaped attachment portions 21 by a bolt, or similar fastener such as a rivet (e.g., the fastener 42 shown in FIGS. 4-5). As shown, the brackets 30, 32 are structurally identical for ease of manufacturing and assembly, however dissimilar brackets may be employed if desired. The stabilization brackets 30, 32 each include a respective projection 34, 36 projecting into the channel 28.

The fuse 40 holds the arms 22, 24 in the non-relaxed position. As shown, the arms 22, 24 are generally parallel to one another in the non-relaxed position. However, the arms 22, 24 need not be parallel. Rather, the non-relaxed position can be any position where the arms 22, 24 are urged, or held, against their bias to the relaxed position. The fuse 40 may further be provided with wires 44 which may be in electric communication with a system controller 200. When the fuse 40 fractures, the controller 200 will sense such a break, such as by a circuit breaking. Accordingly, the cantilevered differential motion sensor 50 (or, sensor 50) is assembled, as generally shown in FIG. 3.

As noted, the arms 22, 24 are formed integrally to have a relaxed position. Thus, when the arms 22, 24 are held at the non-relaxed position by the fuse 40, there is a bias force urging the arms 22, 24 back toward the relaxed position. That is, the arms 22, 24 are held inwardly (relative to the central frame axis A) by the fuse 40 and are biased outwardly to the relaxed position. It is possible, however, to provide the sensor 20 with arms that are biased inwardly, and held outwardly with a fuse. Further, while the arms 22, 24 are disclosed as integrally formed with the rest of the frame 20, it should be understood that the arms 22, 24 could be fixed in some other manner, such as welding. The term "integral" as used in the claims would extend to such an arrangement.

FIGS. 4-5 are top and bottom views, respectively, of the sensor 50 of FIG. 3. For example, the fuse 40 is fastened to a top sensor surface 52, whereas the stabilization brackets 30, 32 are fastened opposite the fuse 40 to a bottom sensor surface 54. Fasteners 42 are used to fasten the brackets 30, 32 and the fuse 40 to the arms 22, 24. As noted above, the fasteners 42 may be bolts, however other similar fasteners such as rivets may be used. The fuse 40 and the brackets 30, 32 are thus arranged to sandwich the central portion 27 of the frame 20. Because of this arrangement, unwanted dynamic motion of the sensor arms 22, 24 is reduced (if not prevented altogether), as explained below.

Figure 6A:
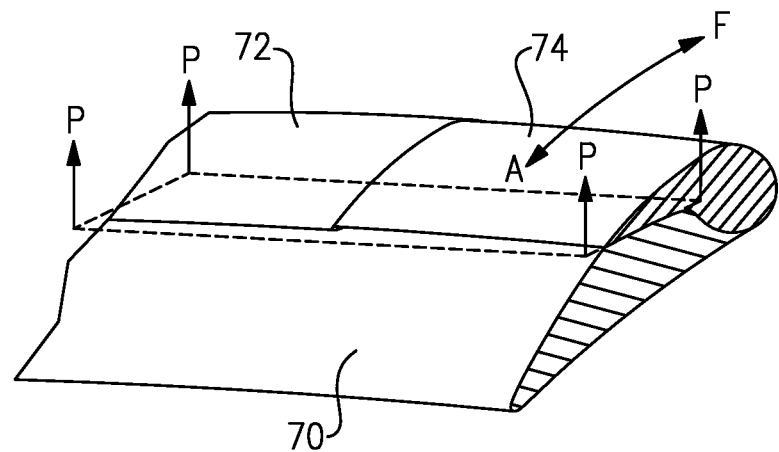
FIG. 6A shows a section of an aircraft wing including two adjacent panels.

With reference to FIG. 6A, a portion of an exemplary aircraft wing 70 is shown. The wing 70 includes two adjacent wing panels 72, 74 which are designed to move together, synchronized in time, during normal operation (or, the panels are configured to move "in sync"). As shown, the panels 72, 74 are wing slats, however the panels could be any two panels designed to move in sync. When the panels 72, 74 are slats, as shown, the panels are generally configured to move in forward F and aft A directions. Plane P is a plane extending below an aft portion of the panels 72, 74, such that the underside of the panels 72, 74 is generally shown in FIG. 6B.

Figure 6B:
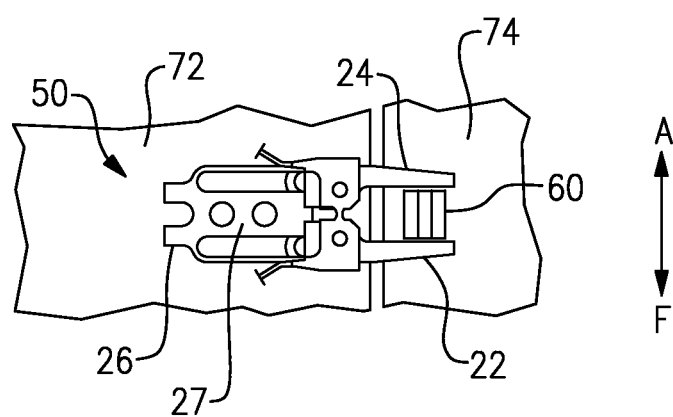
FIG. 6B is a view of the two panels taken along the plane P in FIG. 6A, and is representative of the arrangement of the sensor and pin relative to the panels.

FIG. 6B is a view taken along plane P of the underside of the panels 72, 74, and represents the attachment of the sensor 50 and the pin 60 to the panels 72, 74. For example, when placed in service, the sensor 50 may be fastened to the underside of a first panel 72. A second panel 74 likewise includes the striker pin 60, which is fastened to its underside. The arms 22, 24 of the sensor 50 span the gap between the two panels 72, 74, and the striker pin 60 is located between the sensor arms 22, 24 (as is also represented in FIG. 3). In the event of a malfunction of one or more of the panels 72, 74 affecting their synchronized motion (or, when the panels 72, 74 fail to move "in sync"), the striker pin 60 will contact one of the arms 22, 24. If this contact force is sufficient, the fuse 40 will fracture, such as at weak point 46. After fracture, the sensor arms 22, 24 will return to the relaxed position, which in this case is the extended position, to prevent intermittent contact of the halves of the fuse 40.

In one example, a failure condition may occur when the panel 74 moves in the forward direction F without corresponding motion of the panel 72 (e.g., the panel 72 does not move at all, or the panel 72 moves in the aft direction A relative to the panel 74). The striker pin 60 will then contact the arm 22 of the sensor 50, urging the arm 22 in direction R (e.g., see FIG. 3), and thus causing the fuse 40 to fracture.

Fracture of the fuse 40 may annunciate a failure condition to system controller 200 which will then take appropriate corrective action. For example, the corrective action may include notifying a pilot of the failure condition, and the corrective action may inhibit further motion of the panels. The corrective action may be known, as in the FIG. 1 embodiment.

The failure condition may indicate a failure of the panels to move in sync (e.g., thus indicating a failure of an actuator associated with one or more of the panels), however in some rare instances the failure condition may indicate failure of the sensor 50 itself. For example, the fuse 40 may fracture from unwanted dynamic motion, which may be caused by vibration of the frame 20. That is, dynamic motion of the arms 22, 24, such as motion generally in or out of the page relative to FIG. 3, may cause the fuse 40 to fracture. To prevent this, the central portion 27 of the frame 20 is essentially sandwiched between the brackets 30, 32 and the fuse 40. As seen in FIGS. 4-5, for example, the fuse 40 and the brackets 30, 32 are in direct contact with the central portion 27 and the arms 22, 24. Because the central portion 27 is fastened directly to the panel 72 (e.g., by a bolt or similar fastener through the holes 29), the central portion 27 is more dynamically stable than the arms 22, 24. Accordingly, the arrangement of the fuse 40 and the brackets 30, 32 relative to the central portion 27 provides stability to the arms 22, 24.

FIGS. 7-9 show another sensor frame 120 and sensor 150 according to the instant disclosure. To the extent not otherwise described or shown, the frame 120 and sensor 150 include corresponding parts to those shown in FIGS. 2-5, having corresponding reference numerals preappended with a "1."

With specific reference to FIG. 7, the frame 120 is substantially similar to the frame 20 present in FIG. 2. As described above with reference to the frame 20, the arms 122, 124 of the frame 120 are biased to a relaxed position, shown as the extended position. Notably, the attachment portions 121 of the arms 122, 124 need not be lobe-shaped, and other shapes can be employed to facilitate attachment of the fuse 140 and the brackets 130, 132.

Turning to FIGS. 8 and 9, the assembled sensor 150 includes the fuse 140 and brackets 130, 132. As best seen in the exploded side-view of FIG. 9, the arms 122, 124 are sandwiched between the brackets 130, 132, which are fastened to opposite sides of the central portion 127 of the frame 120. The brackets 130, 132 include groove portions 135, 137 in order to accommodate the arms 122, 124 (specifically, the attachment portions 121 of the arms 122, 124). Because the arms 122, 124 are sandwiched between the brackets 130, 132, and because the brackets 130, 132 are connected to the relatively stable central portion 127, dynamic motion of the arms 122, 124 is substantially prevented. One of ordinary skill would appreciate that different bracket arrangements, including the two different arrangements disclosed herein, may provide varying levels of arm stabilization.

By providing the above described sensors 50, 150, the need for separately machined arms, hinge pins, springs, and lubrication, as well as the need for excessive assembly time and precision machining, is eliminated. Accordingly, overall sensor cost and the potential for misassembly and other related failures is reduced.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A sensor for an aircraft, comprising:
a frame including a base and a plurality of arms integrally formed with the base, the arms moveable between an relaxed position and a non-relaxed position, the arms being biased towards the relaxed position; and
an electromechanical fuse fastened to the arms to hold the arms in the non-relaxed position, the fuse formed separately from the frame.

2. The sensor of claim 1, wherein, when in the relaxed position, the arms are non-parallel relative to one another.

3. The sensor of claim 2, wherein the relaxed position is an extended position.

4. The sensor of claim 1, further including a plurality of brackets fastened to the frame.

5. The sensor of claim 4, wherein the plurality of brackets are fastened to an opposite side of the frame from a side to which the fuse is attached.

6. The sensor of claim 5, further including the frame having a central portion positioned between the arms, and wherein each of the fuse and the plurality of brackets are in direct contact with the central portion to prevent unwanted dynamic motion of the arms.

7. The sensor of claim 1, wherein the frame is integrally formed such that the base and arms provide a continuous, uninterrupted structure.

8. An aircraft panel assembly, comprising:
   a first panel;
   a second panel adjacent the first panel;
   a sensor connected to the first panel, the sensor including a frame having a base and a plurality of arms integrally formed with the base, the arms moveable between a relaxed position and a non-relaxed position, the arms being biased towards the relaxed position;
   an electromechanical fuse fastened to the arms to hold the arms in the non-relaxed position, the fuse formed separately from the frame; and
   a pin connected to the second panel, the pin being positioned between the arms.

9. The assembly of claim 8, wherein, when in the relaxed position, the arms are non-parallel relative to one another.

10. The assembly of claim 8, wherein the first and second panels are wing slats.

11. The assembly of claim 8, wherein the first and second panels are configured to move in sync.

12. The assembly of claim 11, wherein the pin is configured to fracture the fuse when the first and second panels fail to move in sync.

13. The assembly of claim 8, further including a plurality of brackets fastened to the frame, wherein the plurality of brackets are fastened to an opposite side of the frame from a side to which the fuse is attached.

14. The assembly of claim 13, further including the frame having a central portion positioned between the arms, and wherein each of the fuse and the plurality of brackets are in direct contact with the central portion to prevent unwanted dynamic motion of the arms.

15. A method of assembling a sensor for an aircraft, comprising the following steps:
   a) providing a frame including two arms biased to a relaxed position, the frame including a base integrally formed with the two arms;
   b) pinching the arms toward one another;
   c) fastening an electromechanical fuse to the arms after said step b), the fuse formed separately from the frame; and
   d) fastening at least one bracket to the frame after said step b).

16. The method of claim 15, wherein the frame includes a central portion positioned between the arms, and wherein each of the fuse and the at least one bracket are in direct contact with the central portion to prevent unwanted dynamic motion of the arms.

* * * * *